(12) United States Patent
Miyazaki

(10) Patent No.: US 8,381,781 B2
(45) Date of Patent: Feb. 26, 2013

(54) PNEUMATIC TIRE

(75) Inventor: Shinichi Miyazaki, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 416 days.

(21) Appl. No.: 12/671,653

(22) PCT Filed: Aug. 4, 2008

(86) PCT No.: PCT/JP2008/063947
§ 371 (c)(1),
(2), (4) Date: Feb. 1, 2010

(87) PCT Pub. No.: WO2009/022564
PCT Pub. Date: Feb. 19, 2009

(65) Prior Publication Data
US 2011/0024017 A1    Feb. 3, 2011

(30) Foreign Application Priority Data

Aug. 10, 2007  (JP) ................................. 2007-209709
Aug. 10, 2007  (JP) ................................. 2007-209710

(51) Int. Cl.
*B60C 19/08* (2006.01)
(52) U.S. Cl. ..................... 152/152.1; 152/548; 152/556; 152/564; 152/DIG. 2
(58) Field of Classification Search ............... 152/152.1, 152/DIG. 2, 548, 556, 564
See application file for complete search history.

(56) References Cited

U.S. PATENT DOCUMENTS

| | | | | |
|---|---|---|---|---|
| 2,267,503 | A | * | 12/1941 | Lytle .......................... 301/64.6 |
| 5,630,892 | A | * | 5/1997 | Williams et al. ......... 152/209.14 |
| 6,302,173 | B1 | | 10/2001 | Mizuno et al. |
| 7,011,125 | B2 | * | 3/2006 | Zanzig et al. .............. 152/152.1 |
| 2007/0000585 | A1 | | 1/2007 | Uchida et al. |
| 2007/0163690 | A1 | | 7/2007 | Nobuchika et al. |
| 2008/0308203 | A1 | * | 12/2008 | Kunisawa et al. ......... 152/152.1 |

FOREIGN PATENT DOCUMENTS

EP    0 681 931 A1    11/1995

(Continued)

*Primary Examiner* — Justin Fischer
*Assistant Examiner* — Robert Dye
(74) *Attorney, Agent, or Firm* — Birch, Stewart, Kolasch & Birch, LLP

(57) ABSTRACT

The pneumatic tire of the present invention, in which a tread rubber, a sidewall rubber, and a breaker rubber each have an intrinsic volume resistivity of $1 \times 10^8$ Ω·cm or more, a clinch rubber and a chafer rubber each have an intrinsic volume resistivity of $1 \times 10^8$ Ω·cm or less, wherein the pneumatic tire has a first conductive layer that is disposed between a carcass ply, an edge portion of the breaker rubber and the sidewall portion, a second conductive layer that is in contact with the first conductive layer and is disposed between the tread rubber and the carcass, and a pen rubber layer that extends from the second conductive layer to a surface of the tread portion, wherein the first conductive layer, the second conductive layer, and the pen rubber layer each have an intrinsic volume resistivity of $1 \times 10^8$ Ω·cm or less, the carcass ply contains a conductive fibrous material having an intrinsic volume resistivity of $1 \times 10^8$ Ω·cm or less and has a structure that the carcass ply is in contact with the clinch portion, the chafer portion, and the first conductive layer.

4 Claims, 1 Drawing Sheet

FOREIGN PATENT DOCUMENTS

| | | |
|---|---|---|
| EP | 0878330 A2 | 11/1998 |
| EP | 2014488 A1 | 1/2009 |
| JP | 8-34204 A | 2/1996 |
| JP | 10-36559 A | 2/1998 |
| JP | 11-11121 A | 1/1999 |
| JP | 11-180108 A | 7/1999 |
| JP | 2000-85316 A | 3/2000 |
| JP | 2004-243973 A | 9/2004 |
| JP | 2005-254859 A | 9/2005 |
| JP | 2007-8269 A | 1/2007 |
| JP | 2007-176437 A | 7/2007 |
| JP | 2008-213770 A | 9/2008 |

* cited by examiner

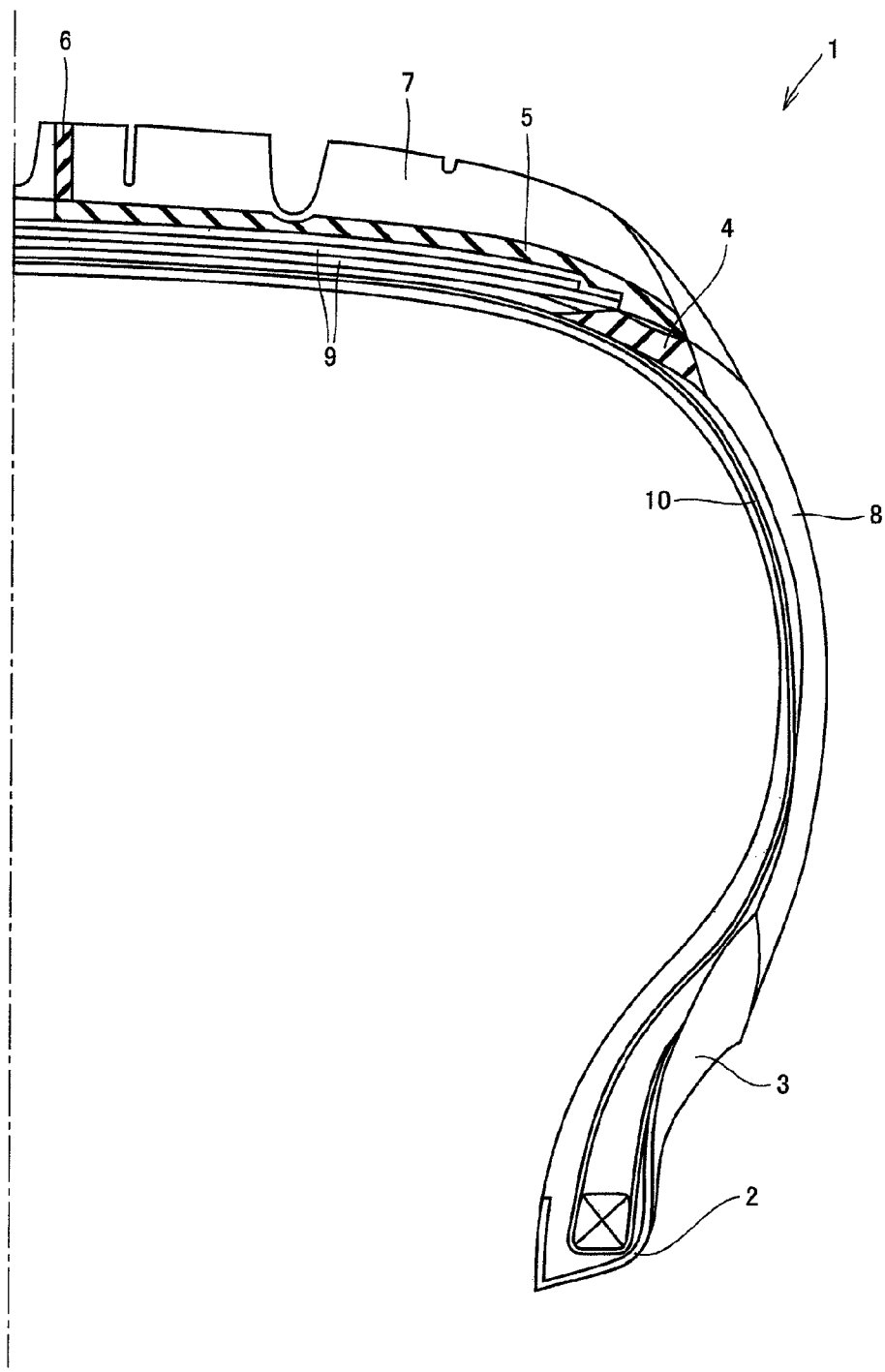

PNEUMATIC TIRE

TECHNICAL FIELD

The present invention relates to a pneumatic tire the electric resistance of which has been reduced by using a conductive fibrous material in a carcass ply.

BACKGROUND ART

Incorporation of silica into a rubber composition that constitutes a tread portion has heretofore been performed as a method for maintaining wet grip performance and at the same time reducing rolling resistance. Moreover, in order to further reduce the rolling resistance, a tire in which silica has been incorporated into the rubber composition constituting its sidewall portion has, for example, been researched (Japanese Patent Laying-Open No. 10-036559 (Patent document 1)).

However, in the case when a large amount of silica is contained, the electric resistance of the tire is increased and, therefore, there is a possibility that a spark might be generated due to static electricity to cause the fuel to catch fire, for example, during refueling for a vehicle, resulting in a safety hazard in use; therefore, there have been strong demands for provision of tires with which the reduction in the rolling resistance and the maintenance of the wet grip performance are realized and generation of static electricity is sufficiently prevented.

For example, Japanese Patent Laying-Open No. 8-034204 (Patent document 2) discloses a method in which a rubber with a low electric resistance is buried in a tread portion as a method for reducing the static electricity. This, however, has resulted from the study of the electric resistance problem in a tread, and is not capable of imparting an excellent rolling resistance and a sufficiently reduced electric resistance to a tire in which silica is blended also to the sidewall portion and the breaker portion as described above.

Patent document 1: Japanese Patent Laying-Open No. 10-036559
Patent document 2: Japanese Patent Laying-Open No. 8-034204

DISCLOSURE OF THE INVENTION

Problems to be Solved by the Invention

An object of the present invention is to provide a tire that has an excellent rolling resistance while maintaining wet grip performance and that has a sufficiently reduced electric resistance.

Means for Solving the Problems

The pneumatic tire of the present invention is characterized in that a tread rubber, a sidewall rubber, and a breaker rubber respectively constituting a tread portion, a sidewall portion, and a breaker portion each have an intrinsic volume resistivity of $1 \times 10^8$ Ω·cm or more and a clinch rubber and a chafer rubber respectively constituting a clinch portion and a chafer portion each have an intrinsic volume resistivity of $1 \times 10^8$ Ω·cm or less, that the pneumatic tire has a carcass extending from the tread portion via the sidewall portion to a bead portion and a conductive layer disposed between the tread portion and the breaker portion, that the conductive layer is composed of a first conductive layer that is disposed between a carcass ply constituting the carcass, an edge portion of the breaker rubber and the sidewall portion, a second conductive layer that is in contact with the first conductive layer and is disposed partly or throughout between the tread rubber and the carcass, and a pen rubber layer that extends from the second conductive layer to a surface of the tread portion, that the first conductive layer, the second conductive layer, and the pen rubber layer each have an intrinsic volume resistivity of $1 \times 10^8$ Ω·cm or less, and that the carcass ply has an intrinsic volume resistivity of $1 \times 10^8$ Ω·cm or less and has a structure that the carcass ply is in contact with at least the clinch portion, the chafer portion, and the first conductive layer.

The carcass ply having the above-mentioned volume resistivity is constituted of a carcass cord and an adhesive resin layer covering the carcass cord, and the adhesive resin layer preferably contains a metal foil. When the metal foil is contained in the adhesive resin layer, it is preferable that 90% by mass or more of the carcass cord is composed by rayon.

In another aspect of the present invention, the carcass ply having the above-mentioned volume resistivity is constituted of a carcass cord and a rubber layer, the carcass cord is preferably made of the conductive fibrous material containing 0.5% by mass to 20% by mass of a conductive fiber, and the conductive fiber is preferably made of polypyrrole.

Effects of the Invention

The pneumatic tire of the present invention is one which can reduce electric resistance of the whole tire by the use of a carcass ply with a controlled intrinsic volume resistivity. By causing the rubbers respectively constituting a tread portion, a sidewall portion, a breaker portion, a clinch portion and a chafer portion to have a prescribed intrinsic volume resistivity, providing a conductive layer between a carcass, an edge portion of the breaker portion, and a sidewall, and further forming a structure that at least the clinch portion, the chafer portion, and the conductive layer are in contact with the carcass ply, it is possible to reduce static electricity of a tire more efficiently, to maintain wet grip and sufficiently lower rolling resistance, and to improve the safety during the use.

BRIEF DESCRIPTION OF THE DRAWINGS

FIG. 1 is a drawing that shows the right half of a cross-sectional view of a pneumatic tire in accordance with the present invention.

DESCRIPTION OF THE REFERENCE SIGNS

1 Pneumatic tire, 2 chafer rubber, 3 clinch rubber, 4 first conductive layer, 5 second conductive layer, 6 pen rubber layer, 7 tread rubber, 8 sidewall rubber, 9 breaker rubber, 10 carcass.

BEST MODES FOR CARRYING OUT THE INVENTION

Pneumatic Tire

A structure of the pneumatic tire of the present invention is the structure that is shown as an example in the upper right half of a cross section of a tire illustrated in FIG. 1. A tire 1 is provided with a tread rubber 7 forming a tread portion, a sidewall rubber 8 forming a pair of sidewall portions extending from both ends of tread rubber 7 in a tire radially inward direction, a clinch rubber 3 forming clinch portions each located at an inner end of each sidewall portion, and a chafer rubber 2 forming a chafer portion located at an upper portion of a rim. Moreover, a carcass 10 is bridged over a clinch portion and a chafer portion, and a breaker rubber 9 forming a breaker portion is disposed on the outside of carcass 10 in the radial direction of the tire. Carcass 10 is formed from a carcass ply composed of one or more sheets in which carcass cords are arranged, and this carcass ply extends from the tread portion via the sidewall portion and turned up from the inside in the tire axis direction outwardly around a bead core and a bead apex extending from the upper end of the bead core toward the sidewall, and engaged and stopped with a turn-up portion. The breaker portion is composed of two or more plies (breaker rubber 9) in which breaker cords are arranged and the plies are superposed in different directions so that breaker cords in one ply may intersect with breaker cords in another ply. In the pneumatic tire of the present invention; a conductive layer is disposed between the tread portion and the breaker portion. The conductive layer is composed of: a first conductive layer 4 that is disposed between a carcass ply forming carcass 10 and each of an edge portion of breaker rubber 9 forming the breaker portion and the sidewall portion; a second conductive layer 5 that is in contact with at least first conductive layer 4 and is disposed throughout or partly on the tread portion disposed between tread rubber 7 and breaker rubber 9; and a pen rubber layer 6 that is buried in the tread portion and connects second conductive layer 5 and a surface of the tread.

<Tread Portion, Sidewall Portion, Breaker Portion>

In the pneumatic tire of the present invention, the tread rubber, the sidewall rubber and the breaker rubber respectively constituting a tread portion, a sidewall portion and a breaker portion are all designed to have an intrinsic volume resistivity of $1 \times 10^8$ Ω·cm or more. If the intrinsic volume resistivity is $1 \times 10^8$ Ω·cm or more, it is possible to maintain a sufficient rolling resistance and there is a reduced possibility of degradation in durability or decrease in processability.

In the present invention, it is desirable that silica be allowed to occupy 50% by mass or more of the filler incorporated in each of the rubbers constituting the tread portion, the sidewall portion and the breaker portion, respectively. When silica occupies 50% by mass or more of the filler, the effect of reducing the rolling resistance of a tire is good. The proportion that silica occupies in the filler is more desirably 70% by mass or more, and even more desirably 90% by mass or more. In the present invention, all the filler may be composed of silica; however, in order to adjust the electrical conductivity and mechanical strength of each of the tread rubber, the breaker rubber and the sidewall rubber, it is also desirable that another filler be used in combination.

With respect to the silica that is incorporated in the tread rubber, the sidewall rubber and the breaker rubber, those commonly used for general purpose rubbers may be used, and examples thereof include dry-method white carbon, wet-method white carbon and colloidal silica, which are used as reinforcing materials. Among these, wet-method white carbon mainly composed of hydrous silicic acid is preferred.

The nitrogen adsorption specific surface area (BET specific surface area) of the silica measured by the BET method is preferably set, for example, at within the range of 50 to 300 m$^2$/g, and more preferably 100 to 200 m$^2$/g. If the BET specific surface area of silica is 50 m$^2$/g or more, a sufficient reinforcing effect is obtained and, as a result, the wear resistance of the tire is improved well. In contrast, if the BET specific surface area is 300 m$^2$/g or less, the processability in manufacturing each of the rubbers is good and the steering stability of the tire is ensured well. Here, the BET specific surface area can be measured in accordance with ASTM D3037-81.

The incorporation amount of silica in each of the tread rubber, the breaker rubber, and the sidewall rubber may be adjusted to 5 parts by mass to 100 parts by mass per 100 parts by mass of the rubber component. When the incorporation amount of silica is set to 5 parts by mass or more per 100 parts by mass of the rubber component, the wear resistance of the tire is good, and when it is set to 100 parts by mass or less, it is possible to well prevent a reduction in the processability in the production of the tread rubber, the breaker rubber and the sidewall rubber due to an increase in viscosity of unvulcanized rubber compositions, and an excessive increase in cost.

When carbon black is incorporated in the tread rubber, the sidewall rubber, or the breaker rubber, it is desirable that the incorporation amount thereof be adjusted to 10 parts by mass to 150 parts by mass per 100 parts by mass of the rubber component because it is possible to impart a reinforcing effect to the rubber constituting the tire. With respect to the carbon black, it is desirable, from the viewpoint of the reinforcing effect, to use one having a BET specific surface area falling within the range of 70 to 300 m$^2$/g, a DBP oil absorption falling within the range of 5 to 300 ml/100 g, and an iodine adsorption falling within the range of 146 to 152 mg/g.

It is noted that, in the present invention, the intrinsic volume resistivity shall refer to a volume resistivity measured in accordance with JIS K6271 at an applied voltage of 1000 V under constant temperature, constant humidity conditions of a temperature of 23° C. and a relative humidity of 55%.

When at least the rubbers respectively constituting the tread portion, the sidewall portion, and the breaker portion have an intrinsic volume resistivity of $1 \times 10^8$ Ω·cm or more, it is difficult to discharge static electricity of a tire to the outside of the tire unless forming a structure that a rubber layer provided at a portion in contact with a rim of a bead is electrically connected to a tread surface. In the present invention, it is possible to discharge static electricity of a tire to the outside of the tire more efficiently by causing a clinch rubber and a chafer rubber respectively constituting a clinch portion and a chafer portion to have a prescribed intrinsic volume resistivity, and providing a conductive layer having a prescribed intrinsic volume resistivity, and forming a structure that those are electrically connected by a prescribed carcass.

<Clinch Portion and Chafer Portion>

As described above, in the pneumatic tire of the present invention, the intrinsic volume resistivities of clinch rubber 3 and chafer rubber 2 respectively constituting the clinch portion and the chafer portion are both set at $1 \times 10^8$ Ω·cm or less. The intrinsic volume resistivities should just be $1 \times 10^8$ Ω·cm or less, and the electrical conductivity of a tire can be secured by adjusting the intrinsic volume resistivities of the clinch rubber and the chafer rubber into the aforementioned range.

As for the clinch rubber and the chafer rubber, in order to make the intrinsic volume resistivity fall within the aforementioned range, it is desirable to incorporate carbon black in an amount falling within the range of 30 to 100 parts by mass per 100 parts by mass of the rubber component constituting the rubbers. The case that 30 parts by mass or more of carbon black per 100 parts by mass of the rubber component is incorporated is desirable because the electrical conductivity of the conductive layer is good. The case that the content of carbon black is 100 parts by mass or less per 100 parts by mass of the rubber component is desirable because the durability is good. The incorporation amount of carbon black is more preferably 35 parts by mass or more, and even more preferably 40 parts by mass or more per 100 parts by mass of the rubber component, and it is more preferably 80 parts by mass or less, and even more preferably 70 parts by mass or less.

The BET specific surface area of carbon black to be incorporated in the clinch rubber and the chafer rubber is preferably adjusted to 100 m²/g or more and 1500 m²/g or less. If the BET specific surface area is 100 m²/g or more, the mechanical strength of the conductive layer is good, and if it is 1500 m²/g or less, it is desirable in securing the processability in manufacturing. The BET specific surface area is more desirably 105 m²/g or more, and is also desirably 1300 m²/g or less, and more desirably 1000 m²/g or less.

The clinch rubber and the chafer rubber in the present invention may contain silica or the like as a filler in addition to carbon black, and from the viewpoint of impartment of good electrical conductivity, carbon black is preferably allowed to occupy 8% by mass or more, more preferably 15% by mass or more, and even more preferably 100% by mass of all fillers to be filled into the rubbers.

<Pen Rubber Layer>

In the tire of the present invention, in order to efficiently discharge the static electricity generated in the tire, a pen rubber layer 6 is provided in the tread portion, the pen rubber layer being in contact with a later-described second conductive layer 5 disposed between the tread portion and the breaker portion and extending to the surface of the tread portion, and the intrinsic volume resistivity of pen rubber layer 6 is adjusted to $1 \times 10^8$ Ω·cm or less. If the intrinsic volume resistivity is $1 \times 10^8$ Ω·cm or less, the effect of improving the electrical conductivity of a tire (discharge efficiency of static electricity) is obtained to a desired degree. The intrinsic volume resistivity of the conductive layer is preferably $1 \times 10^7$ Ω·cm or less and is adjusted more preferably to $1 \times 10^6$ Ω·cm or less. From the viewpoint of improving the electrical conductivity of a tire, it is preferable that the intrinsic volume resistivity of the conductive layer be as low as possible.

As the rubber for constituting the pen rubber layer, a rubber can be used in which carbon black has been incorporated in the same amount as in the cases of the clinch rubber and the chafer rubber. The carbon black to be incorporated preferably has the same BET specific surface area as that for the clinch rubber and the chafer rubber.

In the present invention, the thickness of the pen rubber layer is desirably 0.2 mm or more, and when it is 0.2 mm or more, the effect of improving the electrical conductivity of a tire is obtained to a desired degree. The thickness of the pen rubber layer is desirably 2.0 mm or less, and if it is within this range, the rolling resistance of a tire is not deteriorated greatly even if the pen rubber layer is present apparently in the tread surface. The thickness of the conductive layer is preferably set to 0.5 mm or more, more preferably to 0.9 mm or more, and it is preferably set to 1.5 mm or less.

The structure of the pen rubber layer within the tread portion is not particularly restricted as far as the layer connects the second conductive layer and the tread surface directly. For example, a rubber layer with a thickness of 0.2 mm may be disposed continuously along the tire circumferential direction, or alternatively a plate-like rubber with a thickness of 0.2 mm and a width of 3 mm may be disposed partly within the tread or intermittently along the tire circumferential direction. In particular, it is desirable to dispose a rubber layer continuously along the tire circumferential direction from the viewpoint of the efficiency of discharging static electricity. While the pen rubber layer may be disposed at any position in the tire width direction including the center side and the sidewall side as far as the position is within the tread, it is desirable to dispose the pen rubber layer near the central portion of the tread of a tire in order to bring the pen rubber layer into contact with the ground certainly.

<First Conductive Layer>

The first conductive layer 4 in the present invention is composed of a rubber that is disposed between the carcass ply constituting a carcass 10 described later and an edge portion of the breaker portion and the sidewall portion and that has an intrinsic volume resistivity adjusted to $1 \times 10^8$ Ω·cm or less. If the intrinsic volume resistivity is $1 \times 10^8$ Ω·cm or less, the effect of improving the electrical conductivity of a tire is obtained to a desired degree. The intrinsic volume resistivity of the conductive layer is preferably $1 \times 10^7$ Ω·cm or less and is adjusted more preferably to $1 \times 10^6$ Ω·cm or less. From the viewpoint of the effect of increasing the electrical conductivity of a tire, it is preferable that the intrinsic volume resistivity of the conductive layer be as low as possible. On the other hand, the intrinsic volume resistivity of the conductive layer is preferably $1 \times 10^3$ Ω·cm or more and is adjusted more preferably to $1 \times 10^4$ Ω·cm or more.

The rubber that constitutes the first conductive layer having the above-mentioned intrinsic volume resistivity is desirably a rubber in which 30 to 100 parts by mass of carbon black is incorporated in 100 parts by mass of the rubber component. The adjustment of the amount of carbon black to within this range is desirable in that the electrical conductivity of the first conductive layer can be made good, and that the durability is good. In the rubber that constitutes the first conductive layer, the incorporation amount of carbon black is desirably 35 parts by mass or more, and more desirably 40 parts by mass or more per 100 parts by mass of the rubber component. Further, the incorporation amount of carbon black is more desirably 80 parts by mass or less, and even more desirably 70 parts by mass or less.

The BET specific surface area of the carbon black to be incorporated in the rubber that constitutes the first conductive layer is desirably adjusted to 100 m²/g or more and 1500 m²/g or less. The event that the BET specific surface area is 100 m²/g or more is desirable in that the mechanical strength of the first conductive layer is good, and the event that it is 1500 m²/g or less is desirable in that the processability in manufacturing is secured. The BET specific surface area is more desirably 105 m²/g or more, and is also desirably 1300 m²/g or less, and more desirably 1000 m²/g or less.

While the rubber that constitutes the first conductive layer may contain, for example, silica or the like as a filler in addition to carbon black, it is desirable, from the viewpoint of imparting good electrical conductivity, that carbon black occupies 8% by mass or more, more desirably 15% by mass or more, and even more desirably 100% by mass of all the filler.

The shape of the first conductive layer is not particularly restricted, and it should just be disposed between the carcass ply constituting the carcass, the edge portion of the breaker portion, and the sidewall portion continuously in the tire circumferential direction, as described above. For example, the thickness or the like of the first conductive layer is not particularly limited.

<Second Conductive Layer>

Second conductive layer 5 in the present invention is made of a nibber that is disposed in contact with first conductive layer 4 and pen rubber layer 6 and that is adjusted to have an intrinsic volume resistivity of $1 \times 10^8$ Ω·cm or less. If the intrinsic volume resistivity is $1 \times 10^8$ Ω·cm or less, the effect of improving the electrical conductivity of a tire is obtained to a desired degree. The intrinsic volume resistivity can be set like that of the first conductive layer, and it is set at desirably $1 \times 10^7$ Ω·cm or less, and more desirably at $1 \times 10^6$ Ω·cm or less, whereas it is set desirably at $1 \times 10^3$ Ω·cm or more, and more desirably at $1 \times 10^4$ Ω·cm or more.

The rubber that constitutes the second conductive layer having the above-mentioned intrinsic volume resistivity is desirably a rubber in which 30 to 100 parts by mass of carbon black is incorporated to 100 parts by mass of the rubber component. The adjustment of the amount of carbon black to within this range is desirable in that the electrical conductivity of the second conductive layer can be made good, and that the durability is good. In the rubber that constitutes the first conductive layer, the incorporation amount of carbon black is desirably 35 parts by mass or more, and more desirably 40 parts by mass or more per 100 parts by mass of the rubber component. Further, the incorporation amount of carbon black is more desirably 80 parts by mass or less, and even more desirably 70 parts by mass or less.

The BET specific surface area of the carbon black to be incorporated in the rubber that constitutes the second conductive layer is desirably adjusted to 100 $m^2/g$ or more and 1500 $m^2/g$ or less. The event that the BET specific surface area is 100 $m^2/g$ or more is desirable in that the mechanical strength of the second conductive layer is good, and the event that it is 1500 $m^2/g$ or less is desirable in that the processability in manufacturing is secured. The BET specific surface area is more desirably 105 $m^2/g$ or more, and is also desirably 1300 $m^2/g$ or less, and more desirably 1000 $m^2/g$ or less.

While the rubber that constitutes the second conductive layer may contain, for example, silica or the like as a filler in addition to carbon black, it is desirable, from the viewpoint of imparting good electrical conductivity, that carbon black occupies 8% by mass or more, more desirably 15% by mass or more, and even more desirably 100% by mass of all the filler.

While the thickness of the second conductive layer is not particularly limited, it is desirably adjusted to 0.2 mm or more, and more desirably to 0.5 mm or more from the viewpoint of the effect of improving the electrical conductivity of a tire. While the upper limit of the thickness of the second conductive layer should just be a thickness that is not greater than the gap defined by the tread rubber that constitutes the tread portion and the breaker rubber that constitutes the breaker portion from structural considerations, it is desirable, from the viewpoint of controlling the heat generation of a tire, to adjust the thickness to 1.0 mm or less.

The second conductive layer should just have a portion that is in contact with the first conductive layer and the pen rubber layer, and it can be disposed throughout between the tread portion and the breaker portion or can be disposed partly at a position where the pen rubber layer is formed or within an area that exceeds that position.

As for the portion at which the second conductive layer is in contact with the first conductive layer and the pen rubber layer, it is desirable that there be a belt-shaped portion being in contact with the first conductive layer over a width of 5 mm or more, more desirably over a width of 10 mm or more, along the tire circumferential direction. By causing the first conductive layer and the second conductive layer to be in contact with each other under the aforementioned condition, a conductive effect of a tire can be obtained sufficiently. As for the contact with the pen rubber layer, it is desirable that the whole surface along the tire width direction of the pen rubber layer be in contact.

<Carcass>

Carcass 10 in the present invention is composed of one or more carcass plies in which carcass cords are arranged. Each of the carcass plies contains a conductive fibrous material having an intrinsic volume resistivity of $1×10^8$ Ω·cm or less and it generally is composed of carcass cords and a rubber layer.

<Carcass Cord>

Examples of the fibrous material that constitutes a carcass cord include rayon, nylon, polyester, aramid, and high strength vinylon. These may be used singly or as a mixture of two or more of them. Among fibrous materials for constituting a carcass cord, it is desirable to use rayon in view of the steering stability of a tire. Moreover, it is desirable to use rayon in an amount of 90% by mass or more to the fibrous material that constitutes a carcass cord. Adoption of this use amount can optimize the steering stability.

<Carcass Ply>

In a first embodiment, the carcass ply in the present invention is made of the above-mentioned conductive fibrous material that is composed of a carcass cord and an adhesive resin layer that covers the carcass cord. The adhesive resin layer contains a metal foil and such inclusion of a metal foil makes the intrinsic volume resistivity be $1×10^8$ Ω·cm or less. On a surface of the fibrous material is formed an adhesive resin layer by dipping the material into an RFL-based liquid capable of imparting adhesiveness that is composed of resorcinol, formalin, rubber latex, or the like, followed by drying. The adhesive resin layer of the conductive fibrous material in the present invention contains a conductive substance. Examples of the conductive substance include metal foils, metal particles, and conductive polymers. Among them, metal foils are preferred from the viewpoint that they can impart good electrical conductivity, and it is preferable to use a metal excellent in electrical conductivity, such as silver, copper, and iron. When a metal foil is applied as the conductive substance, the shape thereof is not particularly restricted as long as the intrinsic volume resistivity of the conductive fibrous material can be adjusted to $1×10^8$ Ω·cm or less. For example, the adjustment of the proportion of the metal foil to the whole portion of the adhesive resin layer at 0.1% or more in volume ratio successfully results in the achievement of the above-mentioned intrinsic volume resistivity. While a greater proportion that the metal foil occupies in the adhesive resin layer is preferred because it is desirable that the intrinsic volume resistivity be reduced, it is desirable to make the upper limit be 5% in volume ratio from the viewpoint of securing adhesiveness.

While the distribution of the metal foil in the adhesive resin layer is not particularly restricted as long as the intrinsic volume resistivity can be set at $1×10^8$ Ω·cm or less, it is desirable to distribute the metal foil uniformly because this results in increase in efficiency of contact with tire components and, as a result, the electrical conductivity of the whole tire is increased. Examples of the method for distributing a metal foil in an adhesive resin layer uniformly include a method in which a metal foil is dispersed in a liquid that is to be used for forming the adhesive resin layer and that imparts adhesiveness and then the liquid is stirred and then a fiber is immersed therein to form, on the fibrous material, an adhesive resin layer in which the metal foil is dispersed uniformly.

As a second embodiment, the carcass ply in the present invention uses a conductive fibrous material having an intrinsic volume resistivity of $1×10^8$ Ω·cm or less containing 0.5% by mass to 20% by mass of a conductive fiber as the carcass cords that constitute the carcass ply. While the proportion that the conductive fiber occupies in the carcass cords is not particularly limited because it depends on the electrical conductivity of the fiber, it is desirably adjusted to 0.5% by mass to 12% by mass from the viewpoint that such a proportion does not change the characteristics necessary as carcass cords, such as strength and fatigue resistance, very much.

Examples of the conductive fiber in the second embodiment include polyacethylene, polyparaphenylene, polythiophene, polypyrrole, and polyaniline, which all can be used suitably. In particular, the use of polypyrrole is preferred.

It is desirable to cause a fibrous material constituting a carcass cord and the conductive fiber to form a structure in which the conductive material is wound around the fibrous material constituting a carcass cord. By forming such a structure, a preferable strength of the carcass cord can be obtained.

The intrinsic volume resistivity of the carcass cord having the aforementioned structure is $1 \times 10^8$ $\Omega \cdot cm$ or less. By causing the intrinsic volume resistivity of a carcass cord to fall within this range, it is possible to efficiently discharge static electricity generated in a tire by running. The intrinsic volume resistivity of a carcass cord is preferably $1 \times 10^7$ $\Omega \cdot cm$ or less.

In the second embodiment, an adhesive resin layer that is generally provided to carcass cords of tires is formed on the surface of the fibrous material by dipping the material in an RFL-based liquid for imparting adhesiveness that is composed of resorcinol, formalin, rubber latex, or the like, followed by drying.

The carcass ply that constitutes a carcass in the present invention is disposed so that it may be in contact with at least the clinch rubber, the chafer rubber, and the first conductive layer in both the first and second embodiments. Specifically, for example in the second embodiment, it is possible to produce a state that the carcass ply is in electrical contact with the clinch rubber, the chafer rubber and the first conductive layer by removing a rubber layer covering the carcass cord located at a part which comes into contact with the rubbers and the conductive layer, thereby making the carcass ply capable of coming into direct contact with the rubbers and the conductive layer. It is possible to greatly improve the efficiency of discharging static electricity through a rim by forming an arrangement that a carcass ply with a fully reduced intrinsic volume resistivity is in contact with the clinch rubber, the chafer rubber, and the first conductive layer in addition to producing a structure that the first conductive layer, the second conductive layer and the pen rubber layer are connected together.

<Rubber Composition>

The rubber component to be used in the present invention preferably contains a natural rubber component composed of at least one selected from a natural rubber and an epoxidized natural rubber.

As the natural rubber (NR) can be used ones having heretofore been employed in the rubber industry, examples of which include natural rubbers of such grades as RSS#3 and TSR.

The epoxidized natural rubber (ENR) is a kind of a modified natural rubber resulting from epoxidation of an unsaturated double bond of a natural rubber. The molecular cohesive force increases due to an epoxy group, which is a polar group. Therefore, the epoxidized natural rubber has a glass transition temperature (Tg) higher than that of a natural rubber, and excels in mechanical strength, wear resistance, and air permeation resistance. In particular, in a case where silica is blended into the rubber composition, it is possible to obtain a mechanical strength and a wear resistance of a degree the same as in a case where carbon black is blended into the rubber composition, due to a reaction of a silanol group on a silica surface with the epoxy group of the epoxidized natural rubber.

As the epoxidized natural rubber (ENR), either a commercially available product or a product obtained by epoxidizing a natural rubber (NR) may be used. The method for epoxidizing a natural rubber (NR) is not particularly restricted and examples thereof include a chlorohydrin process, a direct oxidation process, a hydrogen peroxide process, an alkylhydroperoxide process, and a peracid process. One example of the peracid process is a process of causing an organic peracid, such as peracetic acid or performic acid, as an epoxidizing agent to react with an emulsion of a natural rubber.

The epoxidation rate of the epoxidized natural rubber (ENR) is preferably 5 mol % or more, and more preferably 10 mol % or more. The epoxidation rate means the rate of the number of the double bonds epoxidized to the number of all the double bonds in a natural rubber before epoxidation and it can be determined by titrimetric analysis, nuclear magnetic resonance (NMR) analysis, etc. When the epoxidation rate of the epoxidized natural rubber (ENR) is less than 5 mol %, the rubber composition has a low rubber hardness because the glass transition temperature of the epoxidized natural rubber (ENR) is low, and therefore when the rubber composition is used, for example, as an inner liner rubber, the durability and the fatigue resistance of a pneumatic tire tend to lower. The epoxidation rate of the epoxidized natural rubber (ENR) is preferably 60 mol % or less, and more preferably 50 mol % or less. When the epoxidation rate of the epoxidized natural rubber (ENR) exceeds 60 mol %, the mechanical strength tends to lower as a result of hardening of the rubber composition.

More typical examples of the epoxidized natural rubber (ENR) include an epoxidized natural rubber having an epoxidation rate of 25 mol % and an epoxidized natural rubber having an epoxidation rate of 50 mol %.

In the present invention, the content of the natural rubber component in the rubber component is preferably adjusted to 10% by mass or more. When the content is less than 10% by mass, the effect of reducing the use amount of a petroleum resource-derived raw materials tends to lower. The content of the natural rubber component is preferably 30% by mass or more, more preferably 50% by mass or more, and even more preferably 60% by mass or more. While it is desirable that the content of the natural rubber component be 100% by mass because this makes the effect of reducing the use amount of petroleum resource-derived raw materials good, it is also permissible, for example, that depending on desired tire properties, the content is adjusted to 90% by mass or less, or moreover to 80% by mass or less, and a rubber other than the natural rubber component is blended as the rest of the rubber component.

The rubber component of the present invention may contain, in addition to the natural rubber component defined above, a modified natural rubber, such as a hydrogenated natural rubber, as a rubber derived from non-petroleum resources.

Further, the rubber component may contain a rubber derived from petroleum resources as far as the effect of the present invention is not impaired. Examples of the rubber derived from petroleum resources include styrene-butadiene rubber (SBR), butadiene rubber (BR), styrene-isoprene copolymer rubber, isoprene rubber (IR), butyl rubber (IIR), chloroprene rubber (CR), acrylonitrile-butadiene rubber (NBR), halogenated butyl rubber (X-IIR), and a halide of a copolymer of isobutylene with p-methylstyrene. Among these, SBR, BR, IR, and IIR are preferable because the hardness of a rubber composition can be made high, so that it is possible to impart particularly good durability and fatigue resistance to a pneumatic tire.

The content of the natural rubber (NR) in the rubber component is preferably 10% by mass or more. When the content of the natural rubber (NR) is less than 10% by mass, the mechanical strength of the rubber composition tends to become low. The content of the natural rubber (NR) is more preferably 30% by mass or more, and even more preferably 40% by mass or more. The content of the natural rubber (NR) in the rubber component is preferably 90% by mass or less. When the content of the natural rubber (NR) exceeds 90% by mass, the bending resistance of the rubber composition tends to become low. The content of the natural rubber (NR) is more preferably 80% by mass or less, and even more preferably 70% by mass or less.

The content of the epoxidized natural rubber (ENR) in the rubber component is preferably 5% by mass or more. When the content of the epoxidized natural rubber (ENR) is less than 5% by mass, the effect of improving the bending resistance tends to lower. The content of the epoxidized natural rubber (ENR) is preferably 10% by mass or more, more preferably 20% by mass or more, and even more preferably 30% by mass or more. The content of the epoxidized natural rubber (ENR) in the rubber component is preferably 60% by mass or less. When the content of the epoxidized natural rubber (ENR) exceeds 60% by mass, the mechanical strength of the rubber composition tends to lower because the rubber hardness becomes excessively high. The content of the epoxidized natural rubber (ENR) is more preferably 50% by mass or less.

The following components, which are generally blended in rubber products, may appropriately be blended in the rubber composition of the present invention.

When silica is blended into a rubber composition like the rubbers constituting the tread portion, the sidewall portion, and the breaker portion in the present invention, it is desirable to blend a silane coupling agent, such as a silane-based coupling agent or a sulfur-containing silane coupling agent, because the wear resistance and the steering stability of a tire can be improved. In particular, it is preferable to blend a sulfur-containing silane coupling agent.

As the silane-based coupling agent, vinyltrichlorosilane, vinyltris(2-methoxyethoxy)silane, gamma-glycidoxypropyl trimethoxysilane, gamma-methacryloxypropyl trimethoxysilane, gamma-(2-aminoethyl)aminopropyl trimethoxysilane, gamma-chloropropyltrimethoxy silane, gamma-aminopropyl triethoxysilane, and so on can be used.

Examples of the sulfur-containing silane coupling agent include 3-trimethoxysilylpropyl-N,N-dimethylthiocarbamoyol-tetrasulfide, trimethoxysilylpropyl-mercaptobenzothiazole-tetrasulfide, triethoxysilylpropyl-methacrylate-monosulfide, dimethoxymethylsilylpropyl-N,N-dimethylthiocarbamoyl-tetrasulfide, bis-[3-(triethoxysilyl)-propyl]tetrasulfide, and 3-marcaptopropyl trimethoxysilane.

It is desirable that the silane coupling agent be incorporated in an amount within the range of not less than 1% by mass and not more than 20% by mass relative to the mass of silica in each rubber composition. When the incorporation amount of the silane coupling agent is 1% by mass or more, the effect of improving the wear resistance and the steering stability is obtained well. The case that the incorporation amount of the silane coupling agent is 20% by mass or less is preferable because there is a low risk that scorch occurs during the rubber kneading and extruding processes.

In the present invention, another coupling agent, such as aluminate-based coupling agent or a titanium-based coupling agent, may be used alone, or in combination with the silane-based coupling agent, in accordance with the application.

Examples of additional fillers include carbon black, clay, alumina, talc, calcium carbonate, magnesium carbonate, aluminum hydroxide, magnesium hydroxide, magnesium oxide and titanium oxide. These fillers may be used singly or as a mixture of two or more of them.

In addition to the above-mentioned fillers, a vulcanizing agent, a vulcanization accelerator, a softening agent, a plasticizer, an antioxidant, a foaming agent, an anti-scorch agent, and so on may be optionally incorporated in the rubber composition.

With respect to the vulcanizing agent, an organic peroxide or a sulfur-based vulcanizing agent may be used. With respect to the organic peroxide, examples thereof include: benzoyl peroxide, dicumyl peroxide, di-t-butyl peroxide, t-butyl-cumyl peroxide, methyl ethyl ketone peroxide, cumene hydroperoxide, 2,5-dimethyl-2,5-di(t-butylperoxy)hexane, 2,5-dimethyl-2,5-di(benzoylperoxy)hexane, 2,5-dimethyl-2,5-di(t-butylperoxy)hexine-3 or 1,3-bis(t-butylperoxypropyl) benzene, di-t-butylperoxy-diisopropyl benzene, t-butylperoxy benzene, 2,4-dichlorobenzoyl peroxide, 1,1-di-t-butylperoxy-3,3,5-trimethyl siloxane, and n-butyl-4,4-di-t-butylperoxy valerate. As the sulfur-based vulcanizing agent, sulfur and morpholine disulfide may be used, for example. In particular, sulfur is preferred.

With respect to the vulcanization accelerator, those containing at least one vulcanization accelerator selected from the group consisting of sulfene amide-based, thiazole-based, thiuram-based, thiourea-based, guanidine-based, dithiocarbamic acid-based, aldehyde-amine-based or aldehyde-ammonia-based, imidazoline-based and xantate-based vulcanization accelerators may be used.

With respect to the antioxidant, appropriate materials may be selected from amine-based, phenol-based and imidazole-based compounds, carbamic acid metal salts and waxes, and used.

In the present invention, a softening agent may be used in combination in order to further improve the kneading processability of the rubber composition.

With respect to the softening agent, examples thereof include: petroleum-based softening agents, such as process oil, lubricant oil, paraffin, liquid paraffin, petroleum asphalt and vaseline; fatty-oil-based softening agents, such as castor oil, linseed oil, rapeseed oil and coconut oil; waxes, such as tall oil, factice, beeswax, carnauba wax and lanoline; and fatty acids, such as linolic acid, palmitic acid, steartic acid and lauric acid.

Examples of the plasticizer include dimethyl phthalate (DMP), diethyl phthalate (DEP), dibutyl phthalate (DBP), diheptyl phthalate (DHP), dioctyl phthalate (DOP), diisononyl phthalate (DINP), diisodecyl phthalate (DIDP), butylbenzyl phthalate (BBP), dilauryl phthalate (DLP), dicyclohexyl phthalate (DCHP), hydrophthalic anhydride, di-2-ethylhexyl azelate (DOZ), dibutyl sebacate (DBS), dioctyl sebacate (DOS), acetyltriethyl citrate, acetyltributyl citrate, dibutyl maleate (DBM), 2-ethylhexyl maleate (DOM), and dibutyl fumarate (DBF). All of these can be suitably employed.

The anti-scorch agent is an agent that is used for preventing or retarding scorching and, for example, organic acids, such as phthalic anhydride, salicylic acid and benzoic acid, nitroso compounds, such as N-nitrosodiphenylamine, and N-cyclohexylthiophthalimide can be used.

In the present invention, with regard to the conditions of kneading the rubber composition, such as a kneading temperature and a kneading time, kneading conditions generally employed for rubbers constituting tire components may be used.

EXAMPLES

The following description will discuss the present invention in detail by means of examples; however, the present invention is not intended to be limited by these examples.

<Rubber Composition for Clinch Portion and Chafer Portion>

Compounding components indicated in Table 1 from which sulfur and a vulcanization accelerator were excluded were kneaded at 140° C. for 4 minutes by using a tightly-closed type Banbury mixer, and to this were added sulfur and the vulcanization accelerator and further kneaded at 95° C. for 2 minutes, and the resulting material was subjected to an extrusion process and a calender process by using conventional methods, so that rubber compositions 1a and 1b for a clinch portion and a chafer portion were prepared.

The resulting rubber compositions 1a and 1b were each vulcanization molded at 150° C. for 30 minutes, then cut out into a square specimen having a thickness of 2 mm and being 15 cm long at each side, and measured for intrinsic volume resistivity (volume resistivity) under constant temperature, constant humidity conditions of 23° C. and 55% relative humidity, at an applied voltage of 1000 V in accordance with JIS K6271, by using an electric resistance analyzer (R8340A) manufactured by ADVANTES. The results are shown in Table 1.

TABLE 1

| Rubber composition for clinch portion and chafer portion | | Rubber composition 1 a | b |
|---|---|---|---|
| Components (parts by mass) | Natural rubber | 20 | 20 |
| | Synthetic rubber 1 SBR1500 | 80 | 80 |
| | Carbon black N220 | 50 | — |
| | Silica VN3 | — | 50 |
| | Silane coupling agent | — | 5.0 |
| | Aromatic oil | 5 | 5 |
| | Wax | 1.5 | 1.5 |
| | Antioxidant | 1 | 1 |
| | Stearic acid | 1.5 | 1.5 |
| | Zinc white | 3.5 | 3.5 |
| | Sulfur | 1.6 | 1.6 |
| | Vulcanization accelerator | 0.8 | 0.8 |
| Intrinsic volume resistivity ($\Omega \cdot cm$) | | $1.0 \times 10^6$ | $1.0 \times 10^8$ or more |

<Rubber Composition for First Conductive Layer>

Compounding components indicated in Table 2 from which sulfur and a vulcanization accelerator were excluded were kneaded at 140° C. for 4 minutes by using a tightly-closed type Banbury mixer, and to this were added sulfur and the vulcanization accelerator and further kneaded at 95° C. for 2 minutes, and the resulting material was subjected to an extrusion process and a calender process by using conventional methods, so that a rubber composition 2 was prepared.

Moreover, the resulting rubber composition 2 was vulcanization molded under the same conditions as those used for the rubber composition for the clinch portion and the chafer portion, and then an intrinsic volume resistivity was measured. The results are shown in Table 2.

TABLE 2

| Rubber composition for first conductive layer | | Rubber composition 2 |
|---|---|---|
| Components (parts by mass) | Natural rubber | 60 |
| | Polybutadiene | 40 |
| | Carbon black N220 | 45 |
| | Wax | 1 |
| | Antioxidant | 3 |
| | Stearic acid | 1 |
| | Zinc white | 3 |

TABLE 2-continued

| Rubber composition for first conductive layer | | Rubber composition 2 |
|---|---|---|
| | Sulfur | 2 |
| | Vulcanization accelerator | 1 |
| Intrinsic volume resistivity ($\Omega \cdot cm$) | | $1.0 \times 10^6$ |

<Preparation of Rubber Composition for Second Conductive Layer>

Compounding components indicated in Table 3 from which sulfur and a vulcanization accelerator were excluded were kneaded at 140° C. for 4 minutes by using a tightly-closed type Banbury mixer, and to this were added sulfur and the vulcanization accelerator and further kneaded at 95° C. for 2 minutes, and the resulting material was subjected to an extrusion process and a calender process by using conventional methods, so that a rubber composition 3 was prepared.

Moreover, the resulting rubber composition 3 was vulcanization molded under the same conditions as those used for the rubber composition for the clinch portion and the chafer portion, and then an intrinsic volume resistivity was measured. The results are shown in Table 3.

TABLE 3

| Rubber composition for second conductive layer | | Rubber composition 3 |
|---|---|---|
| Components (parts by mass) | Natural rubber | 75 |
| | Synthetic rubber SBR1502 | 25 |
| | Carbon black N220 | 20 |
| | Carbon black N330 | 25 |
| | Antioxidant | 2 |
| | Stearic acid | 1 |
| | Zinc white | 3 |
| | Sulfur | 3 |
| | Vulcanization accelerator | 1 |
| Intrinsic volume resistivity ($\Omega \cdot cm$) | | $1.0 \times 10^6$ |

<Preparation of Rubber Composition for Pen Rubber Layer>

Compounding components indicated in Table 4 from which sulfur and a vulcanization accelerator were excluded were kneaded at 140° C. for 4 minutes by using a tightly-closed type Banbury mixer, and to this were added sulfur and the vulcanization accelerator and further kneaded at 95° C. for 2 minutes, and the resulting material was subjected to an extrusion process and a calender process by using conventional methods, so that a rubber composition 4 was prepared.

Moreover, the resulting rubber composition 4 was vulcanization molded under the same conditions as those used for the rubber composition for the clinch portion and the chafer portion, and then an intrinsic volume resistivity was measured. The results are shown in Table 4.

TABLE 4

| Rubber composition for pen rubber layer | | Rubber composition 4 |
|---|---|---|
| Components (parts by mass) | Natural rubber | 30 |
| | Synthetic rubber SBR1500 | 70 |
| | Carbon black N220 | 55 |
| | Wax | 1.5 |
| | Antioxidant | 2 |
| | Stearic acid | 1 |
| | Zinc white | 3 |
| | Sulfur | 1.8 |
| | Vulcanization accelerator | 1 |
| Intrinsic volume resistivity ($\Omega \cdot cm$) | | $1.0 \times 10^6$ |

<Preparation of Rubber Composition for Tread Portion>

Compounding components indicated in Table 5 from which sulfur and a vulcanization accelerator were excluded were kneaded at 140° C. for 4 minutes by using a tightly-closed type Banbury mixer, and to this were added sulfur and the vulcanization accelerator and further kneaded at 95° C. for 2 minutes, and the resulting material was subjected to an extrusion process and a calender process by using conventional methods, so that a rubber composition 5 was prepared.

Moreover, the resulting rubber composition 5 was vulcanization molded under the same conditions as those used for the rubber composition for the clinch portion and the chafer portion, and then an intrinsic volume resistivity was measured. The results are shown in Table 5.

TABLE 5

| Rubber composition for tread portion | | Rubber composition 5 |
|---|---|---|
| Components (parts by mass) | Synthetic rubber SBR1500 | 100 |
| | Silica VN3 | 50 |
| | Silane coupling agent | 5 |
| | Wax | 1 |
| | Antioxidant | 2 |
| | Stearic acid | 1 |
| | Zinc white | 3 |
| | Sulfur | 1.5 |
| | Vulcanization accelerator | 1 |
| Intrinsic volume resistivity ($\Omega \cdot cm$) | | $1.0 \times 10^8$ or more |

<Preparation of Rubber Composition for Sidewall Portion>

Compounding components indicated in Table 6 from which sulfur and a vulcanization accelerator were excluded were kneaded at 140° C. for 4 minutes by using a tightly-closed type Banbury mixer, and to this were added sulfur and the vulcanization accelerator and further kneaded at 95° C. for 2 minutes, and the resulting material was subjected to an extrusion process and a calender process by using conventional methods, so that rubber compositions 6a and 6b were prepared.

Moreover, the resulting rubber compositions 6a and 6b were each vulcanization molded under the same conditions as those used for the rubber composition for the clinch portion and the chafer portion, and then an intrinsic volume resistivity was measured. The results are shown in Table 6.

TABLE 6

| Rubber composition for sidewall portion | | Rubber composition 6 | |
|---|---|---|---|
| | | a | b |
| Components (parts by mass) | Natural rubber | 60 | 60 |
| | Polybutadiene | 40 | 40 |
| | Carbon black N220 | 45 | — |
| | Silica VN3 | — | 45 |
| | Silane coupling agent | — | 4.5 |
| | Wax | 1 | 1 |
| | Antioxidant | 3 | 3 |
| | Stearic acid | 1 | 1 |
| | Zinc white | 3 | 3 |
| | Sulfur | 2 | 2 |
| | Vulcanization accelerator | 1 | 1 |
| Intrinsic volume resistivity ($\Omega \cdot cm$) | | $1.0 \times 10^6$ | $1.0 \times 10^8$ or more |

<Preparation of Rubber Composition for Breaker Portion>

Compounding components indicated in Table 7 from which sulfur and a vulcanization accelerator were excluded were kneaded at 140° C. for 4 minutes by using a tightly-closed type Banbury mixer, and to this were added sulfur and the vulcanization accelerator and further kneaded at 95° C. for 2 minutes, and the resulting material was subjected to an extrusion process and a calender process by using conventional methods, so that rubber compositions 7a and 7b were prepared.

Moreover, the resulting rubber compositions 7a and 7b were each vulcanization molded under the same conditions as those used for the rubber composition for the clinch portion and the chafer portion, and then an intrinsic volume resistivity was measured. The results are shown in Table 7.

TABLE 7

| Rubber composition for breaker portion | | Rubber composition 7 | |
|---|---|---|---|
| | | a | b |
| Components (parts by mass) | Natural rubber | 100 | 100 |
| | Carbon black N330 | — | 55 |
| | Silica VN3 | 55 | — |
| | Silane coupling agent | 5.5 | — |
| | Antioxidant | 2 | 2 |
| | Cobalt stearate | 2 | 2 |
| | Stearic acid | 1 | 1 |
| | Zinc white | 10 | 10 |
| | Insoluble sulfur | 5.5 | 5.5 |
| | Vulcanization accelerator | 0.9 | 0.9 |
| Intrinsic volume resistivity ($\Omega \cdot cm$) | | $1.0 \times 10^8$ or more | $1.0 \times 10^6$ |

There following were used as the compounded components shown in Tables 1 to 7.

Natural rubber: Commercial name "TSR 20" made in Thailand

Synthetic rubber 1: Commercial name "SBR1500" available from JSR Corporation

Synthetic rubber 2: Commercial name "SBR1502" available from JSR Corporation

Polybutadiene: Commercial name "BR150B" available from ZEON Corporation

Carbon black N220: Commercial name "Seast 6" (BET specific surface area: 119 m²/g) available from Tokai Carbon Co., Ltd.

Carbon black N330: Commercial name "DIABLACK H" (BET specific surface area: 79 m²/g) available from Mitsubishi Chemical Corporation Silica: Commercial name "VN3" (BET specific surface area: 175 m²/g) available from Degussa Silane coupling agent: Commercial name "Si69" available from Degussa Aromatic oil: Commercial name "DIANAPROCESS AH40" available from Idemitsu Kosan Co., Ltd.

Wax: Commercial name "SUNNOC N" available from Ouchi Shinko Chemical Industrial Co., Ltd.

Antioxidant: Commercial name "Antigen 6C" available from Sumitomo Chemical Co., Ltd.

Stearic acid: Commercial name "Stearic acid TSUBAKI" available from NOF Corporation Cobalt stearate: Commercial name "COST-F" available from DIC Corporation Zinc White Zinc oxide available from Mitsui Mining and Smelting Company, Limited Sulfur: Commercial name "Powder Sulfur" available from Karuizawa Seirensho Insoluble sulfur: Commercial name "MU-CRON OT20" available from Shikoku Chemicals Corporation Vulcanization accelerator: Commercial name "NOCCELER NS-P" available from Ouchi Shinko Chemical Industrial Co., Ltd.

<Preparation of Conductive Fibrous Material 1>

Conductive fibrous material A was prepared, wherein the material had a surface adhesive resin layer containing a 0.5× 0.5 mm metal foil with a thickness of 0.15 μm in a mass ratio of 2% on the surface of a fibrous material containing rayon in a mass ratio of 90% and the attachment amount of the surface adhesive resin layer was adjusted to 5.0% (mass ratio) of the fibrous material.

Conductive fibrous material B was prepared, wherein the material had, on the surface of a fibrous material containing rayon in a mass ratio of 90%, a surface adhesive resin layer in an attachment amount of 5.0% (mass ratio) relative to the fibrous material.

The measurement results of the intrinsic volume resistivity of conductive fibrous materials A and B are shown in Table 8.

<Preparation of Conductive Fibrous Material 2>

Conductive fibrous material C was prepared, wherein the material contained polypyrrole as a conductive fiber in a mass ratio of 10% and another fibrous material contained was polyethylene terephthalate.

Moreover, conductive fibrous material D made only of polyethylene terephthalate was prepared as a comparative example.

The measurement results of the intrinsic volume resistivity of conductive fibrous materials C and D are shown in Table 9. It is noted that these fibrous materials were treated on their surfaces with a conventional adhesive treating liquid containing RFL as a major ingredient, followed by being subjected to the tire production described later.

TABLE 8

|  | Conductive fibrous material | |
|---|---|---|
|  | A | B |
| Intrinsic volume resistivity (Ω · cm) | $1.0 \times 10^6$ | $>1.0 \times 10^8$ |

TABLE 9

|  | Conductive fibrous material | |
|---|---|---|
|  | C | D |
| Intrinsic volume resistivity (Ω · cm) | $1.0 \times 10^6$ | $1.0 \times 10^8$ or more |

It is noted that although conductive fibrous materials C and D fail to satisfy the intrinsic volume resistivity of the present invention, they are indicated as conductive fibrous materials for convenience.

Examples 1 and 2, Comparative Examples 1 to 8

Pneumatic tires with a size of 195/65R15 having the structure illustrated in FIG. 1 or a structure similar to the structure illustrated in FIG. 1 were produced by applying the rubber compositions prepared in the procedures described above in the combinations given in Table 10 or Table 11 to a tread portion, a sidewall portion, a breaker portion, a clinch portion, a chafer portion, a pen rubber portion, a first conductive layer and a second conductive layer, and vulcanization molding the composition by pressing at 160° C. for 20 minutes. The structures of the resulting pneumatic tires are as follows.

<Structure of Pneumatic Tire>

Carcass: material conductive fibrous materials given in Table 8 or 9

Breaker portion: material steel cord, structure 2+2×0.23HT
40 cords/5 cm
Angle 24°×24°

<Tire Electrical Conductivity>

Each of the pneumatic tires prepared in the above manner was mounted on a standard rim with a specified inner pressure of 2.0 MPa applied thereto, and with the tread section of the tire being in contact with an iron plate under a load of 4.7 kN, the electric resistance value between the tire rim section and the iron plate was measured with an applied voltage of 100 V. The results are shown in Table 10 or 11.

<Rolling Resistance>

Each of the pneumatic tires prepared in the above manner was mounted on a standard rim with a specified inner pressure of 2.0 MPa applied thereto, and by using a rolling resistance testing machine made by STL Co., Ltd., the rolling resistance was measured at a speed of 80 km/h under a load of 4.7 kN. Based upon a rolling resistance coefficient (RRC) obtained by dividing the measured value of the rolling resistance by the applied load, the rolling resistance of each of Example 1 and Comparative Examples 1 to 4 was calculated by the following formula, and indicated based upon Comparative Example 1 given as 100:

(Rolling resistance)=(Rolling resistance coefficient of Comparative Example 1)/(Rolling resistance coefficient of each of Example 1 and Comparative Examples 1 to 4)×100.

Moreover, the rolling resistance of each of Example 2 and Comparative Examples 5 to 8 was calculated by the following formula, and indicated based upon Comparative Example 2 given as 100

(Rolling resistance)=(Rolling resistance coefficient of Comparative Example 5)/(Rolling resistance coefficient of each of Example 2 and Comparative Examples 5 to 8)×100.

The greater the value is, the smaller the rolling resistance is and the better the performance is. The results are shown in Table 10 or Table 11.

TABLE 10

|  | Example | Comparative Example | | | |
|---|---|---|---|---|---|
|  | 1 | 1 | 2 | 3 | 4 |
| Rubber composition for clinch portion and chafer portion | 1a | 1a | 1a | 1a | 1b |
| Rubber composition for first conductive layer | 2 | 2 | — | — | 2 |
| Rubber composition for second conductive layer | 3 | 3 | 3 | 3 | 3 |
| Rubber composition for pen rubber layer | 4 | 4 | — | 4 | 4 |
| Rubber composition for tread portion | 5 | 5 | 5 | 5 | 5 |

TABLE 10-continued

|  | Example | Comparative Example | | | |
|---|---|---|---|---|---|
|  | 1 | 1 | 2 | 3 | 4 |
| Rubber composition for sidewall portion | 6b | 6b | 6b | 6a | 6b |
| Rubber composition for breaker portion | 7a | 7a | 7b | 7a | 7a |
| Conductive fibrous material | A | B | A | A | A |
| Intrinsic volume resistivity ($\Omega \cdot cm$) | $2.2 \times 10^6$ | $>1.0 \times 10^8$ | $4.1 \times 10^6$ | $3.7 \times 10^6$ | $>1.0 \times 10^8$ |
| Rolling resistance | 100 | 102 | 103 | 103 | 104 |

TABLE 11

|  | Example | Comparative Example | | | |
|---|---|---|---|---|---|
|  | 2 | 5 | 6 | 7 | 8 |
| Rubber composition for clinch portion and chafer portion | 1a | 1a | 1a | 1a | 1b |
| Rubber composition for first conductive layer | 2 | 2 | — | — | 2 |
| Rubber composition for second conductive layer | 3 | 3 | 3 | 3 | 3 |
| Rubber composition for pen rubber layer | 4 | 4 | — | 4 | 4 |
| Rubber composition for tread portion | 5 | 5 | 5 | 5 | 5 |
| Rubber composition for sidewall portion | 6b | 6b | 6b | 6a | 6b |
| Rubber composition for breaker portion | 7a | 7a | 7b | 7a | 7a |
| Conductive fibrous material | C | D | C | C | C |
| Intrinsic volume resistivity ($\Omega \cdot cm$) | $2.2 \times 10^6$ | $>1.0 \times 10^8$ | $4.1 \times 10^6$ | $3.7 \times 10^6$ | $>1.0 \times 10^8$ |
| Rolling resistance | 100 | 102 | 103 | 103 | 104 |

The results disclosed in Table 10 and Table 11 show that in Comparative Examples 1 and 5, in which conductive fibrous material B or D with an insufficiently reduced intrinsic volume resistivity was used as a conductive fibrous material, the effect of reducing the static electricity of a tire is not improved. It is also shown that even when a conductive fibrous material with a sufficiently reduced intrinsic volume resistivity is used, Comparative Examples 2, 3, 6, and 7, in which silica was incorporated in neither a sidewall portion nor a breaker portion, each fail to result in a tire with which balance between reduction in static electricity and increase in rolling resistance of a tire is achieved. Moreover, it is shown that even when a conductive fibrous material having a fully reduced intrinsic volume resistivity is used, it is impossible to reduce static electricity of the whole tire if the intrinsic volume resistivity of the rubber composition to be used for a clinch portion and a chafer portion has not been fully reduced. On the other hand, it is shown that reduction of both the rolling resistance and the static electricity is excellent with regard to the tires of the present invention having a structure that, like Examples 1 and 2, the intrinsic volume resistivity of the rubber compositions respectively constituting a tread portion, a sidewall portion, and a breaker portion are let be $1.0 \times 10^8$ $\Omega \cdot cm$ or more, the intrinsic volume resistivity of the rubber compositions respectively constituting a clinch portion and a chafer portion are let be $1.0 \times 10^8$ $\Omega \cdot cm$ or less, a first conductive layer, a second conductive layer, and a pen rubber layer each having a fully reduced volume resistivity are provided, and these are electrically connected by a carcass ply containing conductive fibrous material A or C with an intrinsic volume resistivity adjusted to $1.0 \times 10^8$ $\Omega \cdot cm$ or less.

While the embodiment and Examples of the present invention have been described, proper combinations of the structures of the aforementioned embodiment and Examples have also been planned from the outset.

It should be understood that the embodiments and examples disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The pneumatic tire of the present invention, which can prevent generation of static electricity between the road surface and the tire without causing a big increase in the rolling resistance, is desirably applied to, for example, various vehicles such as passenger cars, trucks, buses and heavy machines.

The invention claimed is:
1. A pneumatic tire comprising:
a tread rubber, a sidewall rubber, and a breaker rubber respectively constituting a tread portion, a sidewall portion, and a breaker portion each have an intrinsic volume resistivity of $1 \times 10^8$ $\Omega \cdot cm$ or more and a clinch rubber and a chafer rubber respectively constituting a clinch portion and a chafer portion each have an intrinsic volume resistivity of $1 \times 10^8$ $\Omega \cdot cm$ or less,
wherein the pneumatic tire has a carcass extending from said tread portion via said sidewall portion to a bead portion and a conductive layer disposed between said tread portion and said breaker portion,
said conductive layer is composed of a first conductive layer that is disposed between a carcass ply constituting said carcass, an edge portion of said breaker rubber and said sidewall portion, a second conductive layer that is in contact with the first conductive layer and is disposed partly or throughout between said tread rubber and said carcass, and a pen rubber layer that extends from the second conductive layer to a surface of the tread portion, wherein said first conductive layer, said second conductive layer, and said pen rubber layer each have an intrinsic volume resistivity of $1\times10^8$ Ω·cm or less, said carcass ply comprises carcass cords comprised of polyacethylene, polyparaphenylene, polythiophene, polypyrrole or polyaniline fibers, which have an intrinsic volume resistivity of $1\times10^8$ Ω·cm or less, and said carcass ply has a structure that said carcass ply is in contact with at least said clinch portion, said chafer portion, and said first conductive layer.

2. The pneumatic tire according to claim 1, wherein said carcass ply further comprises an adhesive resin layer covering the carcass cords, and said adhesive resin layer contains a metal foil.

3. The pneumatic tire according to claim 2, wherein 90% by mass or more of said carcass cords is composed by rayon.

4. The pneumatic tire according to claim 1, wherein said carcass ply comprises the carcass cords containing 0.5% by mass to 20% by mass of a conductive fiber, and a rubber layer.

* * * * *